(12) United States Patent
Miura et al.

(10) Patent No.: US 7,939,980 B2
(45) Date of Patent: May 10, 2011

(54) MOTOR MOUNTED WITH STOPPER FITTING FOR FIXING BALL BEARING

(75) Inventors: Yukio Miura, Nagano (JP); Mitsuaki Shioiri, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 71 days.

(21) Appl. No.: 12/533,393

(22) Filed: Jul. 31, 2009

(65) Prior Publication Data

US 2010/0026119 A1 Feb. 4, 2010

(30) Foreign Application Priority Data

Aug. 1, 2008 (JP) ................................. 2008-199867
Jul. 14, 2009 (JP) ................................. 2009-166001

(51) Int. Cl.
*H02K 5/16* (2006.01)
(52) U.S. Cl. ......................................................... 310/90
(58) Field of Classification Search .................... 310/90; 384/903, 535
See application file for complete search history.

(56) References Cited

U.S. PATENT DOCUMENTS

| | | | | |
|---|---|---|---|---|
| 4,236,767 A | * | 12/1980 | Feldle | 384/488 |
| 5,459,361 A | * | 10/1995 | Morioka | 310/67 R |
| 6,007,253 A | * | 12/1999 | Rutter | 384/539 |
| 6,507,134 B1 | * | 1/2003 | Severien et al. | 310/90 |
| 7,465,101 B2 | * | 12/2008 | Hoefs | 384/517 |

FOREIGN PATENT DOCUMENTS

JP 05-030701 2/1993

* cited by examiner

*Primary Examiner* — Nguyen N Hanh
(74) *Attorney, Agent, or Firm* — Rankin, Hill & Clark LLP

(57) ABSTRACT

A motor, in which a creep phenomenon can be prevented and a ball bearing can readily be mounted, is provided. A pair of end brackets each have a bearing hole in which a ball bearing is fitted. A pair of ball bearings are fitted into the bearing holes of the end brackets such that an outer race portion of each ball bearing may abut on a first wall surface and a second wall surface of the end bracket. A stopper fitting is pushed into a recessed portion of the end bracket until a ring portion of the stopper fitting abuts on the outer race portion of the ball bearing. Six engaging pieces of the stopper fitting are engaged in a fourth wall surface defining the recessed portion due to a restoring force of the engaging pieces, which have been resiliently bent or warped, to restore from the bent or warped state. Thus, each ball bearing is tightly fixed in the bearing hole by means of the stopper fitting.

12 Claims, 9 Drawing Sheets

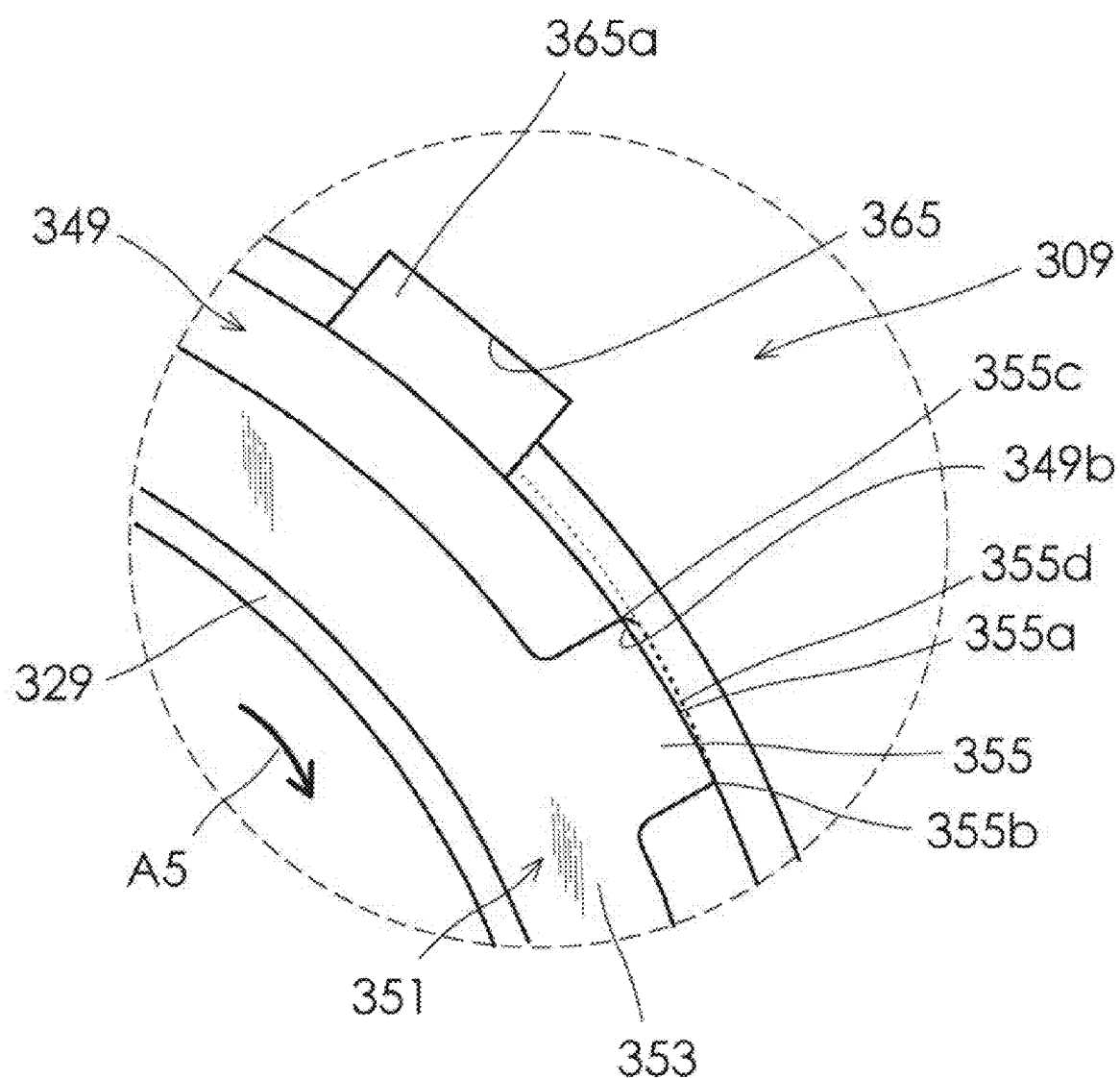

MOTOR MOUNTED WITH STOPPER FITTING FOR FIXING BALL BEARING

BACKGROUND OF THE INVENTION

1. Field of the Invention

The present invention relates to a motor in which a ball bearing can readily be mounted.

2. Description of the Related Art

Japanese Patent Application Publication No. 05-030701 (JP05-030701A) discloses a motor which comprises a rotor including a shaft, a stator, a pair of ball bearings rotatably supporting both ends of the shaft, and a pair of end brackets each having a bearing hole in which the ball bearing is fitted and mounted on either end of the stator. The pair of ball bearings each include an inner race portion and an outer race portion, and rolling elements disposed between the inner and outer race portions. In this motor, a spring member is disposed between the inner race portion of one of the pair of ball bearings and a rotor member of the rotor and is biased to space apart the inner race portion and the rotor member.

In such a motor, however, slippage or a so-called creep phenomenon occurs between the inner race portion of the ball bearing and the shaft, or the outer race portion of the ball bearing and the end bracket. This phenomenon may damage a portion at which the outer race portion of the ball bearing and the end bracket is fitted with each other.

SUMMARY OF THE INVENTION

An object of the present invention is to provide a motor in which a creep phenomenon can be prevented and a ball bearing can readily be mounted.

Another object of the present invention is to provide a motor in which a stopper fitting for fixing a ball bearing onto an end bracket can readily be mounted.

A motor of which improvement is aimed at by the present invention comprises a stator; an end bracket having a bearing hole formed therein and mounted on the stator; a ball bearing fitted into the bearing hole of the end bracket; a shaft supported by the ball bearing; and a rotor member fixed on the shaft. The motor of the present invention also comprises a stopper fitting for fixing the ball bearing in the bearing hole. The end bracket has an annular recessed portion formed therein to be fitted with the stopper fitting. Hardness of a portion of the end bracket where the recessed portion is formed is smaller than hardness of the stopper fitting. The stopper fitting includes an abutting portion abutting on an outer race portion of the ball bearing, and a plurality of engaging pieces integrally formed with the abutting portion and engaged in the recessed portion of the end bracket. The engaging pieces are disposed at a predetermined angular interval in a circumferential direction of the abutting portion and extend radially outwardly from the abutting portion. Material quality of the stopper fitting and shapes of the engaging pieces and the recessed portion are determined such that leading ends of the engaging pieces are engaged in a wall surface of the recessed portion.

Preferably, the material quality of the stopper fitting and the shapes of the engaging pieces and the recessed portion are determined such that the engaging pieces are resiliently bent or warped in an opposite direction to a pushing direction for the stopper fitting when the stopper fitting is pushed in the recessed portion, and the leading ends of the engaging pieces are engaged in the wall surface of the recessed portion due to a restoring force of the engaging pieces to restore from the resiliently bent or warped state.

The bearing hole of the end bracket, in which a ball bearing is fitted, is defined by a first wall surface extending in the radial direction of the shaft and a second wall surface continuous with the first wall surface and extending in both a circumferential direction and an axial direction of the shaft, and the end bracket is configured to allow the ball bearing fitted in the bearing hole to face the rotor member. The recessed portion of the end bracket is defined by a third wall surface continuous with the second wall surface and extending in the radial direction and a fourth wall surface continuous with the third wall surface and extending in the circumferential direction and the axial direction. The wall surface of the recessed portion, in which the engaging pieces are engaged, is constituted from the fourth wall surface.

According to the present invention, the ball bearing is fixed onto the end bracket using the stopper fitting, thereby preventing slippage between an outer race portion of the ball bearing and the end bracket. If only prevention of the slippage or a creep phenomenon is aimed at, the ball bearing may be fixed onto the end bracket using an adhesive or by means of thermal insert. With such fixing techniques, the manufacturing process of a motor is inevitably complicated and lengthy. In contrast, according to the present invention, the ball bearing can be fixed onto the end bracket simply by pushing the stopper fitting into the recessed portion of the end bracket with ball bearing being fitted into the bearing hole of the end bracket.

A motor of the present invention may be manufactured as described below. First, a pair of ball bearings are fitted into the bearing holes of a pair of end brackets such that the outer race portions of the ball bearings may abut on the first and second wall surfaces. Next, the stopper fitting is pushed in the recessed portion of the end bracket. Thus, the engaging pieces of the stopper fitting are engaged in the fourth wall surface, thereby fixing the pair of ball bearings onto the pair of end brackets. Then, the stator, the rotor equipped with a spring member, and the pair of end brackets are assembled.

In this manner, the ball bearing can readily be fixed onto the end bracket simply by pushing the stopper fitting into the recessed portion of the end bracket, thereby eliminating the necessity of waiting until the adhesive has been hardened or using a heating apparatus for thermal insert.

According to the present invention, leading ends of the engaging pieces of the stopper fitting are engaged in the fourth wall surface of the recessed portion (or the wall surface of the recessed portion) due to a restoring force of the engaging pieces to restore from the resiliently bent or warped state, thereby tightly fixing the ball bearing onto the end bracket.

Preferably, the engaging pieces may be disposed at a constant angular interval. The term "constant angular interval" means an equidistant interval in the circumferential direction. Here, a plurality of pull-out grooves for pulling out the engaging pieces, which are opened in an opposite direction to a pushing direction for the stopper fitting and also opened inwardly in the radical direction, may be formed in an outer edge portion of the recessed portion at a constant angular interval. In this configuration, the length of the pull-out grooves as measured in the circumferential direction is larger than the length of the engaging pieces as measured in the circumferential direction. Bottom surfaces of the pull-out grooves formed in the pushing direction are positioned more inwardly in the pushing direction than the leading ends of the engaging pieces engaged in the fourth wall surface (the wall surface) of the recessed portion. This configuration may allow the stopper fitting to be readily removed from the recessed portion by rotating the stopper fitting fixed in the recessed portion by a predetermined angle in the circumferential direction to locate the leading ends of the engaging pieces in the pull-out grooves and pulling out the engaging pieces from the pull-out grooves. As mentioned above, the stopper fitting can readily be mounted to tightly fix the ball bearing onto the end bracket.

The stopper fitting that has been removed from the recessed portion will return to the original shape (before the stopper fitting has been pushed in the recessed portion), and may be re-used and mounted again.

A plurality of push-in grooves for pushing in the engaging pieces, which are opened in the opposite direction and also opened inwardly in the radial direction, may be formed in the outer edge portion of the recessed portion at the constant angular interval. In this configuration, the length of the push-in grooves as measured in the circumferential direction is larger than the length of the engaging pieces as measured in the circumferential direction. Bottom surfaces of the push-in grooves formed in the pushing direction are inclined such that depths of the push-in grooves increase inwardly in the radial direction, and are positioned more outwardly in the opposite direction than the bottom surfaces of the pull-out grooves. If such push-in grooves are provided, the stopper fitting may be pushed in the recessed portion such that the engaging pieces are inserted into the push-in grooves. The leading ends of the engaging pieces will abut onto the inclined bottom surfaces of the push-in grooves and then be resiliently bent or warped, and then abut onto the fourth wall surface. Thus, the engaging pieces may readily be bent or warped resiliently on a stepwise manner.

Assuming that the push-in grooves formed as described above are grouped into one group, another group of push-in grooves may be formed such that another group of push-in grooves are shifted from the one group of push-in grooves by a predetermined angle. After the stopper fitting has been removed from the recessed portion, the push-in grooves, into which the engaging pieces were inserted, or the portions in which the engaging pieces were engaged in may be damaged. If the stopper fitting is pushed in the recessed portion again, the engaging pieces may be inserted into another group of push-in grooves different from those push-in grooves previously used, thereby tightly fixing the stopper fitting in the recessed portion.

Preferably, an inclined surface inclining outwardly in the radial direction may be formed between adjacent two of the pull-out grooves in the outer edge portion of the recessed portion. In this configuration, the leading ends of the engaging pieces will abut on the inclined surfaces and then be resiliently bent or warped when the stopper fitting is pushed in the recessed portion. Then, the engaging pieces are inserted into the recessed portion. Thus, the engaging pieces may readily be bent or warped resiliently in a stepwise manner.

A plurality of grooves, which are opened opposite to a pushing direction for the stopper fitting and also opened inwardly in the radical direction, may be formed in the outer edge portion of the recessed portion at an angular interval which is one-nth of the constant angular interval where n is an integer of at least one. In this configuration, the length of the grooves as measured in the circumferential direction is larger than the length of the engaging pieces as measured in the circumferential direction. Bottom surfaces of the grooves formed in the pushing direction are positioned such that the abutting portion may abut on the outer race portion of the ball bearing when the leading ends of the engaging pieces of the stopper fitting are inserted into the grooves and then the stopper fitting is fitted in the recessed portion. The stopper fitting is rotated by a predetermined angle in the circumferential direction after the engaging pieces of the stopper fitting are inserted into the grooves and then the stopper fitting gets fitted in the recessed portion, and the leading ends of the engaging pieces are engaged in the fourth wall surface of the recessed portion. In this configuration, the leading ends of the engaging pieces are engaged in the fourth wall surface constituting the recessed portion as the stopper fitting is rotated by a predetermined angle in the circumferential direction and the leading ends of the engaging pieces are accordingly rotated to get into the fourth wall surface. Thus, the ball bearing may tightly be fixed onto the end bracket by means of the stopper fitting.

Preferably, an inclined surface may be formed on each of the leading ends of the engaging pieces such that the length of the inclined surface, as measured in the radial direction, increases from one end to the other end of the inclined surface in the circumferential direction. With this configuration, the leading ends of the engaging pieces may readily be engaged in the fourth wall surface constituting the recessed portion by rotating the stopper fitting from one end to the other end in the circumferential direction.

In this configuration, since the grooves are formed at an angular interval that is one-nth of the constant interval at which the engaging pieces are disposed where n is an integer of at least one, the number of the grooves may be a multiple of the engaging pieces. If the stopper fitting is mounted in the recessed portion again after it has been removed therefrom, the engaging pieces may be inserted into grooves that are different from those previously used, thereby tightly mounting the stopper fitting.

An axial end portion of the shaft positioned between the inner race portion of one of the ball bearings and the rotor member may be shaped such that the diameter of the axial end portion increases in a direction from the ball bearing to the rotor member. In this configuration, a coil spring may preferably be used such that the axial end portion of the shaft passes through the coil spring. Thus, if the diameter of a portion of the shaft where the rotor member is fixed is increased, a spring member may be disposed between the inner race portion of one ball bearing and the rotor member.

BRIEF DESCRIPTION OF THE DRAWINGS

FIG. 9 is an enlarged view of a region designated at M2 in FIG. 8.

DETAILED DESCRIPTION OF PREFERRED EMBODIMENTS

Figure 1:
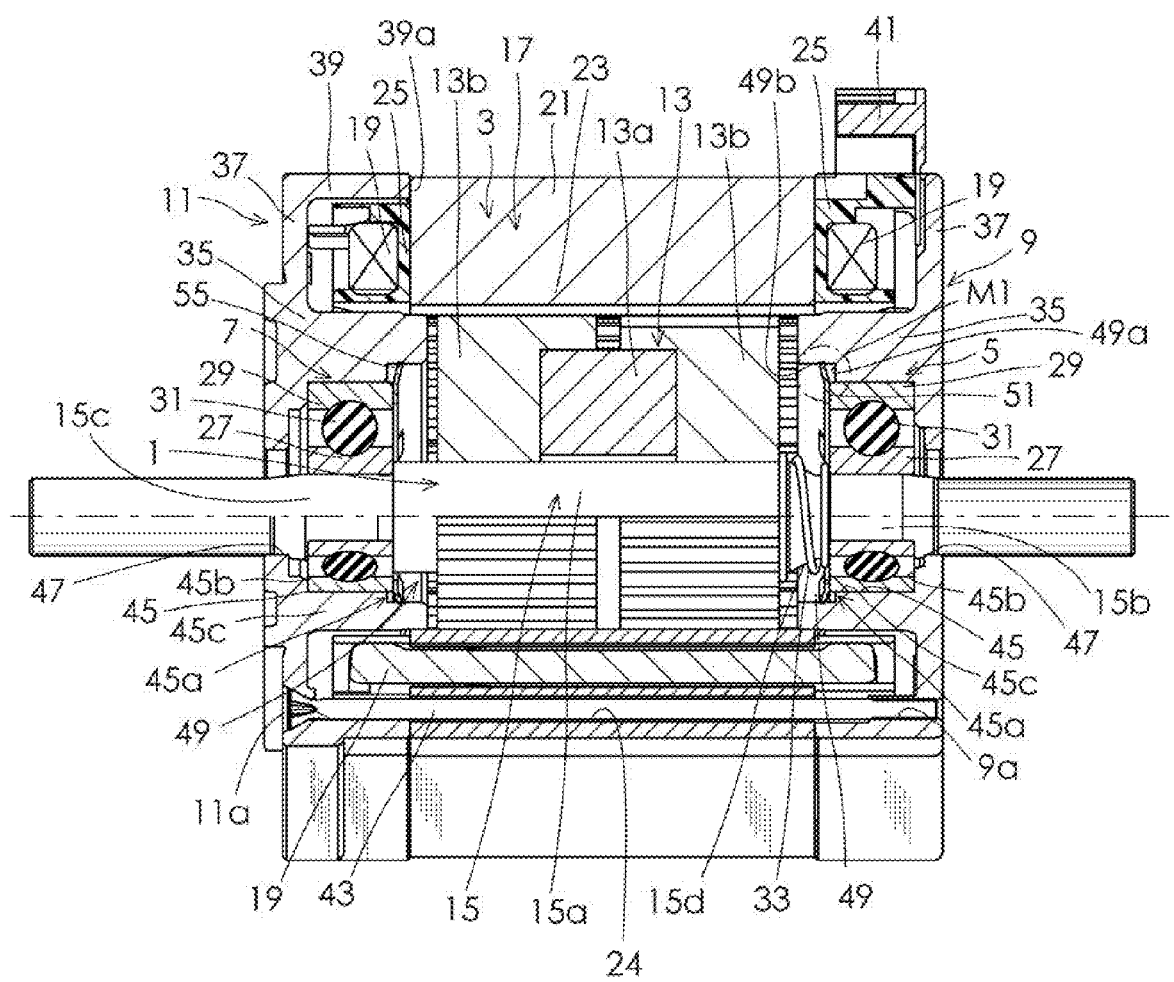
FIG. 1 is a sectional view of a stepping motor according to an embodiment of the present invention.

Now, embodiments of the present invention will be hereinafter described in detail with reference to accompanying drawings. FIG. 1 is a sectional view of a hybrid stepping motor according to an embodiment of the present invention, illustrating an angular range of 135 degrees around an axial line of a shaft 15 of the motor. The motor of the present invention comprises a rotor 1, a stator 3, a pair of ball bearings 5, 7 and a pair of end brackets 9, 11. The rotor 1 includes a rotor member 13 and the shaft 15 onto which the rotor member 13 is fixed. The rotor member 13 includes permanent magnets 13a magnetized in an axial direction of the shaft 15 and a pair of rotor stacks 13b each formed of laminated magnetic steel plates, fixed onto the shaft 15, and having a plurality of teeth portions formed on an outer periphery thereof.

The shaft 15 includes a central portion 15a onto which the rotor member 13 is fixed, a non-output end portion 15b located on one end of the central portion 15a and not connected to a load, an output end portion 15c located on the other end of the central portion 15a and connected to a load, and a connecting portion 15d connecting the central portion 15a and the non-output end portion 15b. The central portion 15a has a larger diameter than that of the non-output end portion 15b and that of the output end portion 15c. The connecting portion 15d is shaped such that the diameter thereof increases in a direction from the non-output end portion 15b to the central portion 15a. The central portion, non-output end portion, and output end portion of the shaft may have the same diameter.

The stator 3 includes a stator core 17 formed of laminated magnetic steel plates and a plurality of winding portions 19. The stator core 17 is disposed radially outside the rotor member 13 to allow the rotor member 13 to rotate therein, and includes a cylindrical yoke 21 and a plurality of magnetic poles 23 projecting toward the rotor member 13 and facing the rotor member 13. The magnetic poles each have a plurality of teeth portions formed on a magnetic pole surface thereof. The plurality of winding portions 19 are wound around the magnetic poles 23 via an insulator 25 and provided on the stator core 17.

The pair of ball bearings 5, 7 each include an inner race portion 27, an outer race portion 29, and a plurality of rolling elements 31 disposed between the inner race portion 27 and the outer race portion 29. The ball bearings rotatably support both ends of the shaft 15. Specifically, the non-output end portion 15b of the shaft 15 is fitted in the inner race portion 27 of one ball bearing 5 in the pair of ball bearings 5, 7 and the output end portion 15c of the shaft 15 is fitted in the inner race portion 27 of the other ball bearing 7 in the pair. An axial end portion or the connection portion 15d positioned between the inner race portion 27 of one ball bearing 5 of the shaft 15 and the rotor member 13 is determined such that the diameter of the axial end portion increases in a direction from the one ball bearing 5 to the rotor member 13.

A spring member 33 is disposed between the inner race portion 27 of the one ball bearing 5 and the rotor member 13. The spring member 33 is biased to space apart the inner race portion 27 and the rotor member 13. In this embodiment, the spring member 33 is constituted from a coil spring through which the connecting portion 15d passes.

The pair of end brackets 9, 11 each include a bracket body 35 of which the outline is substantially columnar; an annular wall portion 37 extending radially outwardly of the shaft 15 from the bracket body 35 and integrally formed with the bracket body; and ribs 39 extending from the wall portion 37 in the axial direction of the shaft 15. The end brackets in the pair are integrally formed individually by means of aluminum die cast. A terminal assembly 41 having an external connection terminal is installed outside one end bracket 9 in the pair of end brackets 9, 11 and is electrically connected to the winding portions 19. Screw holes 9a are formed at four corners of the one end bracket 9. Assembling through holes 11a are formed at four corners of the other end bracket 11 for assembling purpose. Four through holes 24 are formed in the yoke 21 of the stator core 17 to be aligned with the four screw holes 9a and the four assembling through holes 11a. Screw members 43 are inserted into the assembling through holes 11a. Leading ends of the screw members 43 are screwed into the screw holes 9a. The bracket bodies of the pair of end brackets 9, 11 are shallowly fitted with end portions of the magnetic poles 23 of the stator core 17. End surfaces 39a of the ribs 39 abut on an end portion of the yoke 21 of the stator core 17. Accordingly, the winding portions 19 are disposed in a gap defined by the bracket body 35, the wall portion 37, and the ribs 39. The pair of end brackets 9, 11 are mounted on both ends of the stator 3.

The bracket body 35 of the end bracket 9, 11 has a bearing hole 45 and a through hole 47 formed therein. The through hole 47 communicates with the bearing hole 45 and the shaft 15 passes through the through hole 47. The bearing hole 45 is defined by a first wall surface 45b extending in the radial direction of the shaft 15 and a second wall surface 45c continuous with the first wall surface 45b and extending in both a circumferential direction and an axial direction of the shaft 15, and has an opening portion 45a opened to face the rotor member 13. The outer race portion 29 of the one ball bearing 5 is inserted through the opening portion 45a and fitted into the bearing hole 45 of one end bracket 9. The outer race portion 29 of the other ball bearing 7 is inserted through the opening portion 45a and fitted in the bearing hole 45 of the other end bracket 11. Thus, the pair of ball bearings 5, 7 are fitted in the bearing holes 45 of the pair of end brackets 9, 11 with the outer race portions 29 of the end brackets 9, 11 abutting on the first wall surface 45b and the second wall surface 45c of the end rackets 9, 11. Then, the pair of ball bearings 5, 7 fitted in the bearing holes 45 face the rotor member 13.

Figure 2:
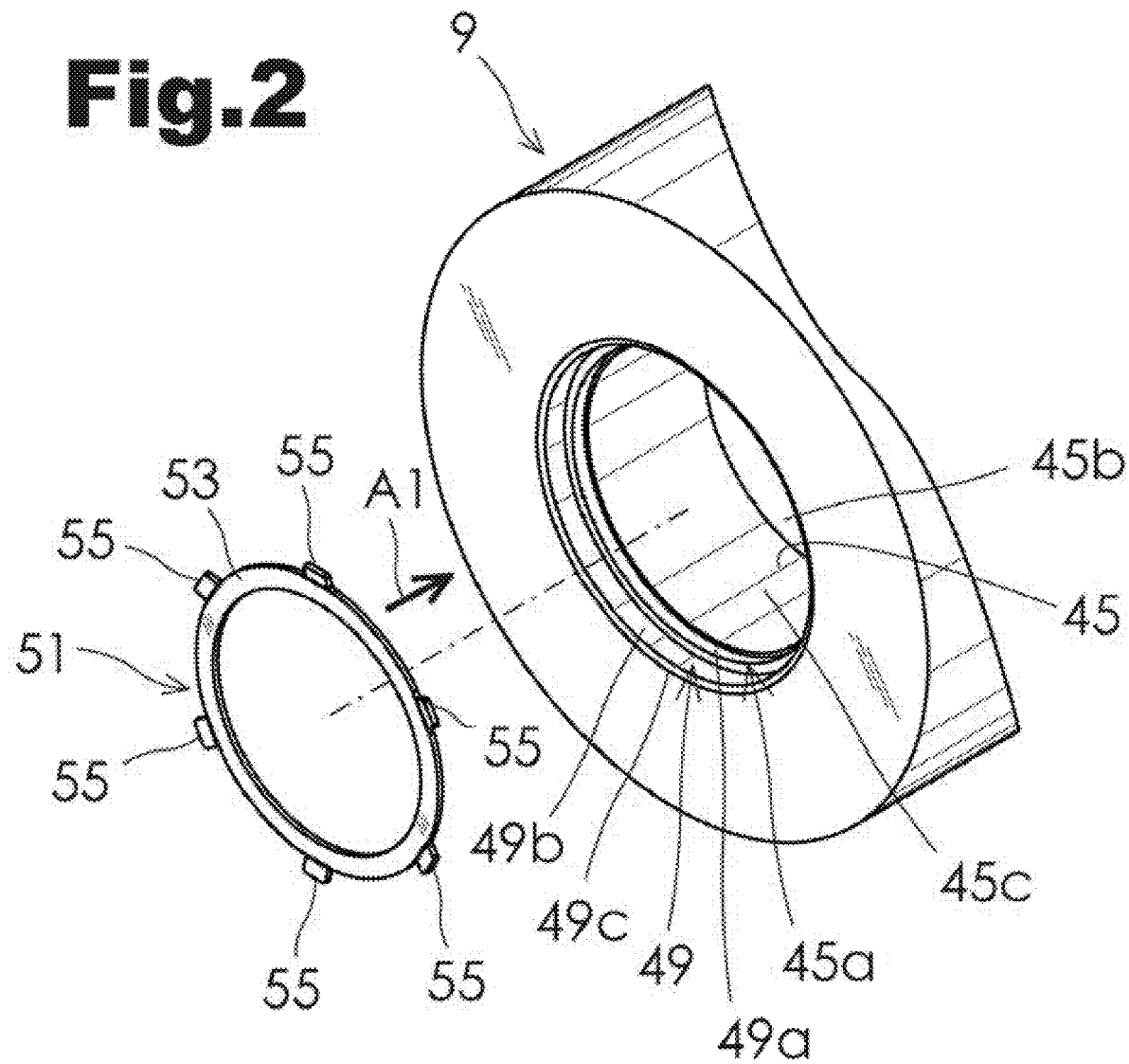
FIG. 2 is a perspective view of an end bracket and a stopper fitting that are disassembled.

As illustrated in FIG. 2 an enlarged decomposed view, an annular recessed portion 49 is formed in an outer edge portion of the opening portion 45a of the bearing hole 45 of the end bracket 9, 11. A stopper fitting 51 is fitted in the recessed portion 49 to prevent the ball bearings 5, 7 fitted in the bearing holes 45 from coming off from the bearing holes 45. FIG. 2 is a perspective view of a part of the inside of the one end bracket 9 and the stopper fitting 51 that are disassembled. In this figure, the rotor 1 and the one ball bearing 5 are omitted. The recessed portion 49 is defined by an annular third wall surface 49a continuous with the second wall surface 45c and extending in the radial direction and a fourth wall surface 49b continuous with the third wall surface 49a and extending in the circumferential direction and the axial direction. An annular inclined surface 49c is formed on the outer edge portion of the recessed portion 49.

The stopper fitting 51 is made from a metal plate typically of carbon steel, and integrally includes a ring portion 53 which forms an abutting portion and six engaging pieces 55. Hardness of a portion of the end bracket 9, 11 where the recessed portion 49 is formed (hardness of the whole end brackets 9, 11 in this embodiment) is smaller than hardness of the stopper fitting 51. The ring portion 53 is circular in shape, and abuts on the outer race portion 29 of the ball bearing 5, 7. Six engaging pieces 55 are disposed at a constant angular interval of 60 degrees in a circumferential direction of the ring portion 53 and extending from the ring portion 53 radially outwardly of the ring portion 53 (radially outwardly of the shaft 15).

Figure 3:
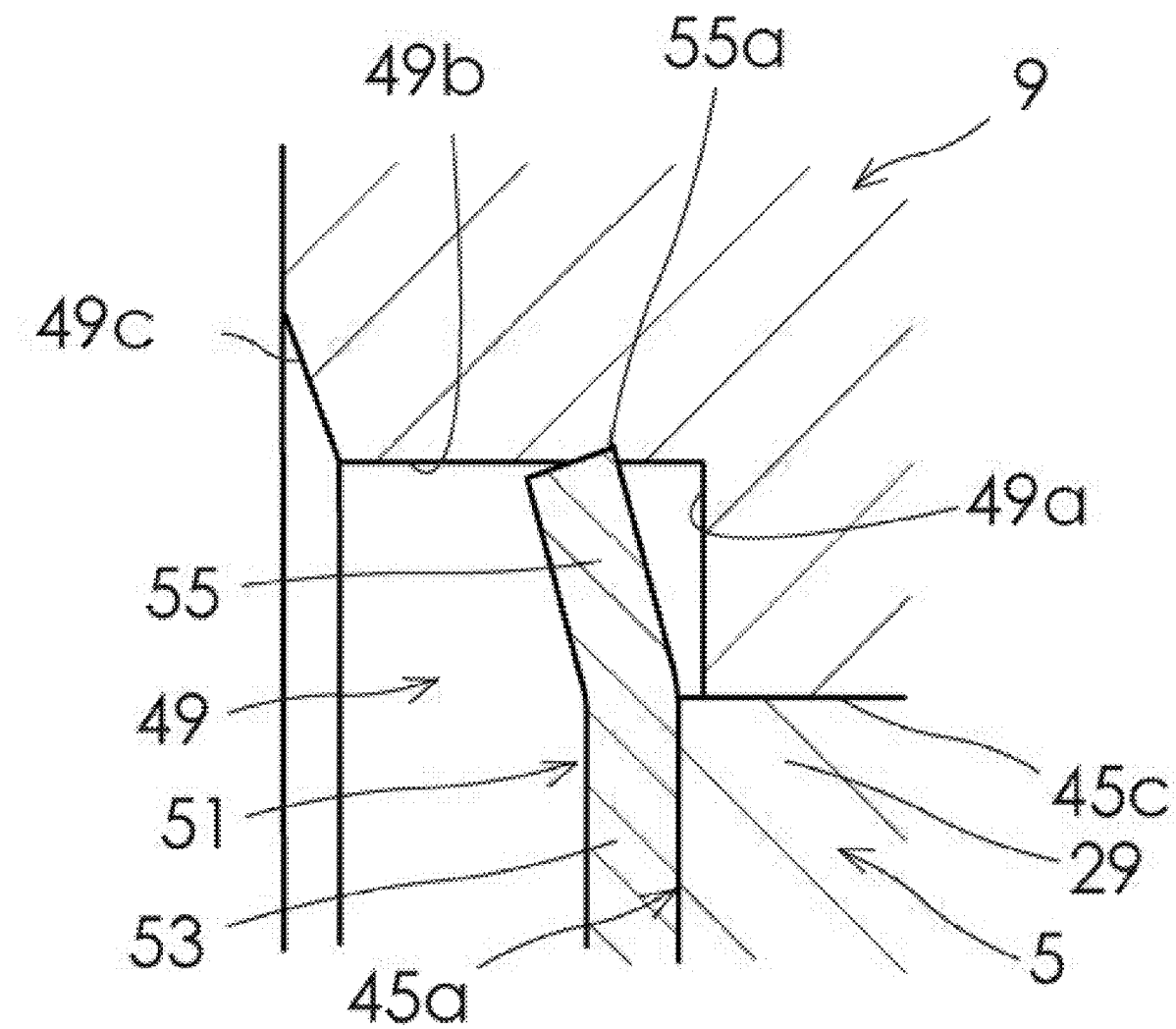
FIG. 3 is an enlarged view of a region designated at M1 in FIG. 1.

As shown in FIG. 3 an enlarged view of a region designated at M1 in FIG. 1, the engaging pieces 55 are resiliently bent or warped relative to the ring portion 53 in an opposite direction to a pushing direction for the stopper fitting 51 when the stopper fitting 51 is pushed in the recessed portion 49, and leading ends 55a of the engaging pieces 55 are engaged in the wall surface (the fourth wall surface 49a) of the recessed portion.

The motor of this embodiment is assembled as described below. First, the pair of ball bearings 5, 7 are fitted into the bearing holes 45 such that the outer race portions 29 of the ball bearings 5, 7 may abut on the first wall surface 45b and the second wall surface 45c of the end brackets 9, 11.

Next, the stopper fitting 51 is brought close to the recessed portion 49 of the end brackets 9, 11. As illustrated in FIG. 2, the stopper fitting 51 is shaped such that the engaging pieces 55 are slightly bent or warped relative to the ring portion 53 when the stopper fitting 51 is not fitted in the recessed portion 49. The diameter of a portion of the stopper fitting 51 where the engaging pieces 55 are formed is slightly larger than the outer diameter of the recessed portion 49 or the outer diameter of the third wall surface 49a. Then, the stopper fitting 51 is pushed in the recessed portion 49. The leading ends 55a of the engaging pieces 55 of the stopper fitting 51 will abut onto the inclined surface 49c and then engaged in fourth wall surface 49b. The six engaging pieces 55 are resiliently bent or warped in an opposite direction to a pushing direction for the stopper fitting 51 as indicated with an arrow A1 in FIG. 2. Once the stopper fitting 51 is pushed in until the ring portion 53 abuts on the outer race portion 29 of the ball bearing 5, 7, the leading ends 55a of the engaging pieces 55 are engaged in the fourth wall surface 49b due to a restoring force of the six engaging pieces 55 to restore from the resiliently bent or warped state. Thus, mounting of the stopper fitting 51 is completed. In other words, material quality of the stopper fitting 51 and shapes of the six engaging pieces 55 and the recessed portion 49 are determined such that the six engaging pieces 55 are resiliently bent or warped in the opposite direction to the pushing direction for the stopper fitting 51 when the stopper fitting 51 is pushed in the recessed portion 49, and the leading ends 55a of the six engaging pieces 55 are engaged in the fourth wall surface 49b due to a restoring force of the six engaging pieces 55 to restore from the resiliently bent or warped state.

Next, the output end portion 15c of the shaft 15 is fitted into the inner race portion 27 of the other ball bearing 7, and the other end bracket 11 is combined with the rotor 1. The stator 3 and the other end bracket 11 are assembled. Then, the spring member 33 that is a coil spring is mounted on the connecting portion 15d of the shaft 15 of the rotor 1 mounted on the end bracket 11 and the stator 3.

Next, the non-output end portion 15b of the shaft 15 is fitted into the inner race portion 27 the one ball bearing 5. Then, the rotor 1 and the one end bracket 9 are combined, and the one end bracket 9 and the stator 3 are assembled.

Next, four screw members 43 are inserted into the assembling through holes 11a of the other end bracket 11. The leading ends of the screw members 43 are screwed into the screw holes 9a of the one end bracket 9. Thus, assembling of the motor is completed.

In this embodiment of the present invention, the ball bearings 5, 7 are fixed using the stopper fittings 51. The leading ends 55a of the engaging pieces 55 are engaged in the fourth wall surface 49b constituting the recessed portion 49 simply by pushing the stopper fitting 51 into the recessed portion 49, thereby fixing the ball bearings 5, 7 onto the end brackets 9, 11. Thus, the pair of ball bearings 5, 7 may readily be mounted onto the pair of end brackets 9, 11 with a simple operation.

Figure 4:
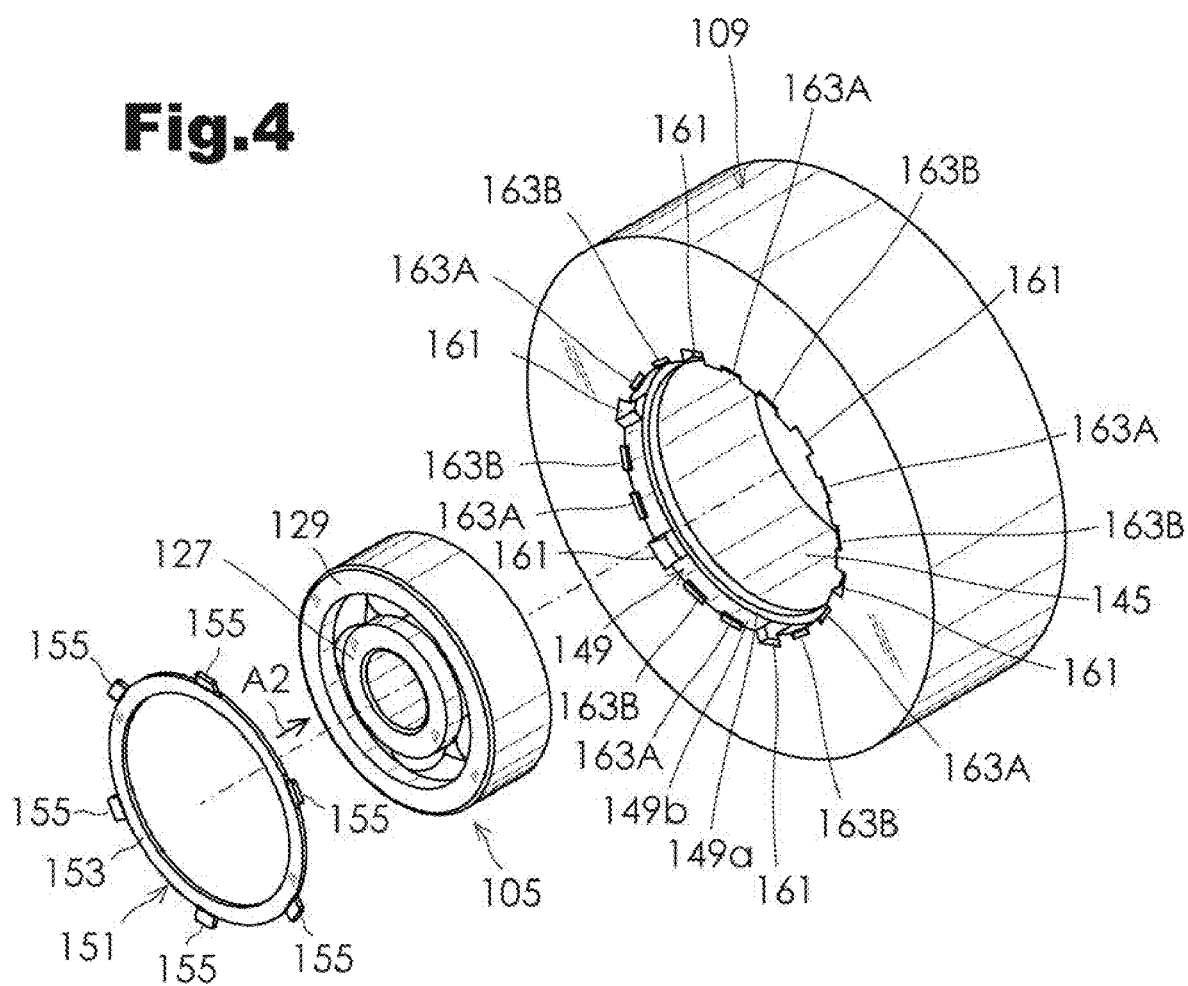
FIG. 4 is a perspective view of a part of the inside of an end bracket and a stopper fitting, which are disassembled, according to another embodiment of the present invention.
Figure 5:
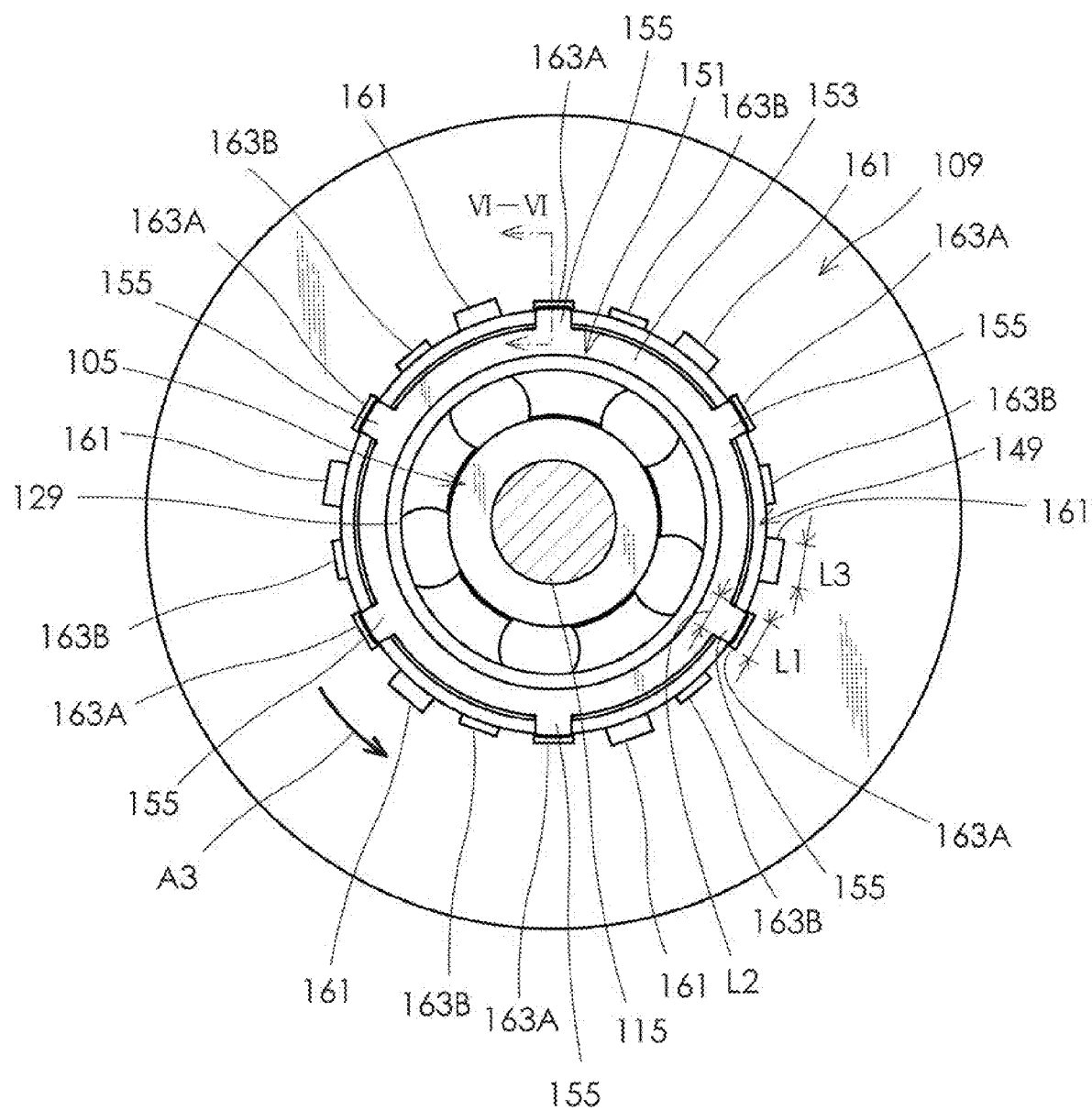
FIG. 5 is a plan view of the end bracket of the motor in FIG. 4 as viewed from the inside thereof.
Figure 6:
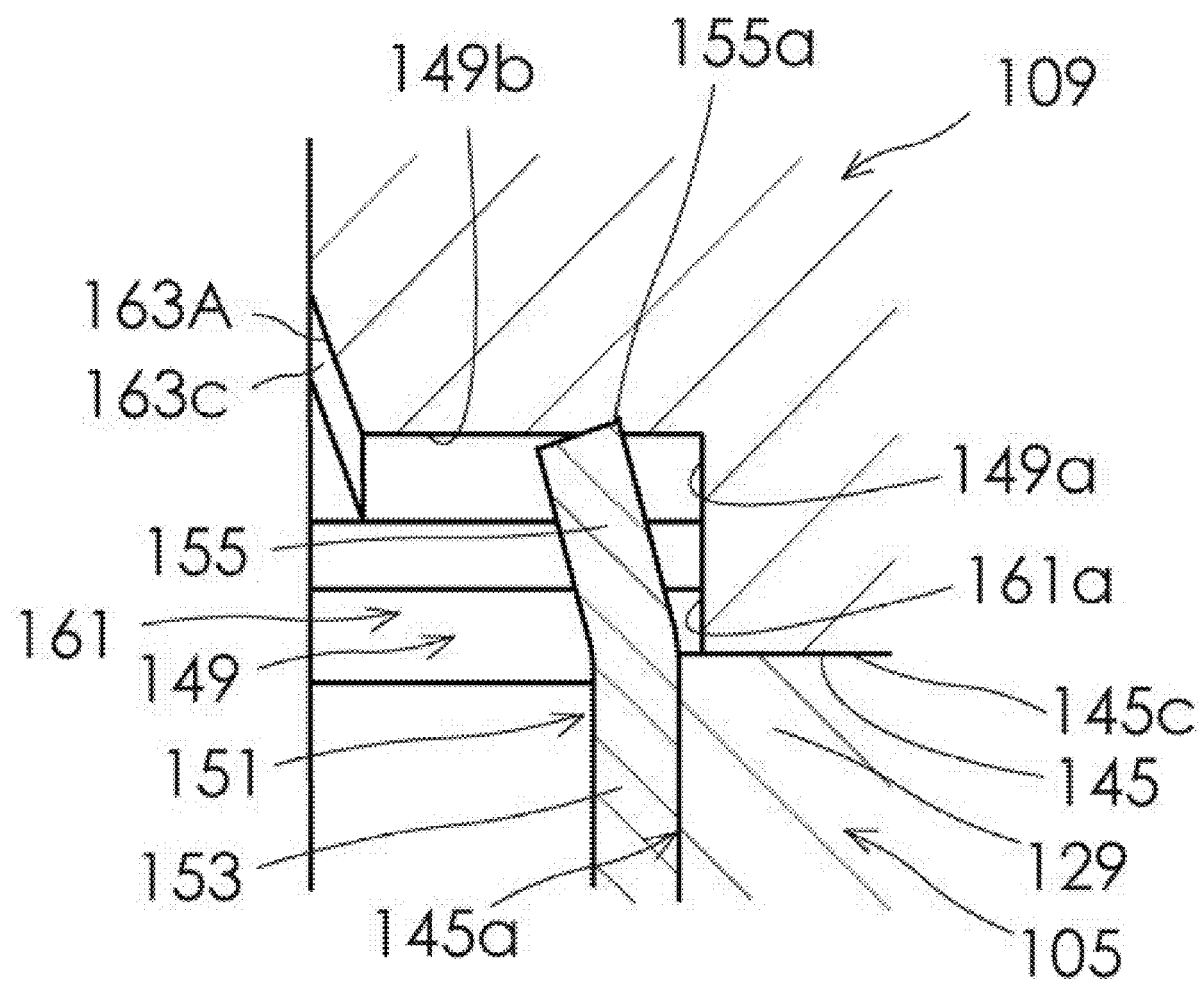
FIG. 6 is a cross-sectional view as taken along line VI-VI of FIG. 5.

FIG. 4 is a perspective view of a part of the inside of one end bracket 109, a ball bearing 105, and a stopper fitting 151 that are disassembled according to another embodiment of the present invention. FIG. 5 is a plan view of the one end bracket 109 of the motor in FIG. 4 as viewed from the inside thereof. FIG. 6 is a sectional view as taken along line VI-VI of FIG. 5. The motor of this embodiment has the same structure as the motor illustrated in FIGS. 1 to 3, except the periphery of a recessed portion 149. Those members and parts that are the same as those of the motor illustrated in FIGS. 1 to 3 are designated at reference numerals obtained by adding 100 to the reference numerals used for the motor illustrated in FIGS. 1 to 3, and descriptions thereof are omitted.

Six pull-out grooves 161 for pulling out the engaging pieces 155 of the stopper fitting 151 and twelve push-in grooves 163A, 163B for pushing in the engaging pieces 155 of the stopper fitting 151 are formed in an outer edge portion of the recessed portion 149 of the motor according to this embodiment. The pull-out grooves 161 are used to pull out the engaging pieces 155 of the stopper fitting 151 from the recessed portion 149. The push-in grooves 163A, 163B are used to push the engaging pieces 155 of the stopper fitting 151 into the recessed portion 149. The configuration of the pull-out grooves 161 will be described in detail later. The twelve push-in grooves 163A, 163B are divided into two groups, a first group of six grooves 163A and a second group of six grooves 163B. The six grooves 163A of the first group are formed in the outer edge portion of the recessed portion 149 at an angular interval equal to the angular interval of 60 degrees at which the six engaging pieces 155 of the stopper fitting 151 are formed in the circumferential direction of the ring portion 153. The six push-in grooves 163B of the second group are also formed in the outer edge portion of the recessed portion 149 at an angular interval equal to the angular interval of 60 degrees at which the six engaging pieces 155 of the stopper fitting 151 are formed in the circumferential direction of the ring portion 153. The six push-in grooves 163A of the first group are shifted from the push-in grooves 163B of the second group by a predetermined angle (20 degrees, in this embodiment). Thus, the number (12 or twelve) of the push-in grooves 163A, 163B are twice more than that (6 or six) of the engaging pieces 155. As illustrated in FIG. 5, the length L1 of the push-in grooves 163A, 163B as measured in the circumferential direction is larger than the length L2 of the engaging pieces 155 as measured in the circumferential direction. As illustrated in FIG. 6, bottom surfaces 163c of the push-in grooves 163A, 163B formed in the pushing direction are inclined such that depths of the push-in grooves 163A, 163B increase inwardly in the radial direction, and are positioned more outwardly in the opposite direction to the pushing direction for the stopper fitting 151 than the bottom surfaces 161a of the pull-out grooves 161.

In this embodiment, the stopper fitting 151 is mounted on the motor as described below. First, a pair of ball bearings 105, 107 are fitted into bearing holes 145 of end brackets 109, 111. Though the end bracket 111 and the ball bearing 117 are not shown, reference numerals are allocated to them for convenience. Next, the stopper fitting 151 is brought close to the recessed portion 149 of the end bracket 109, 111 such that the six push-in grooves 163A of the first group and the six engaging pieces 155 may face each other. Then, the six engaging pieces 155 are inserted into the six push-in grooves 163A and the stopper fitting 151 is pushed into the recessed portion 149. The leading ends 155a of the engaging pieces 155 will abut onto the bottom surfaces 163c of the push-in grooves 163a and then onto the fourth wall surface 149b. The six engaging pieces 155 will be resiliently bent or warped in the opposite direction to the pushing for the stopper fitting 151. Once the stopper fitting 151 is pushed in until the ring portion 153 abuts on the outer race portion 129 of the ball bearing 105, the leading ends 155a of the six engaging pieces 155 will be engaged in the fourth wall surface 149b due to a restoring force of the engaging pieces 155 to restore from the resiliently bent or warped state. Thus, mounting of the stopper fitting 151 is completed (see FIG. 6). In other words, the material quality of the stopper fitting 151 and the shapes of the engaging pieces 155 and the recessed portion 149 are determined such that the six engaging pieces 155 are resiliently bent or warped in the opposite direction to the pushing direction for the stopper fitting 151 when the stopper fitting 151 is pushed in the recessed portion 149, and the leading ends 155a of the engaging pieces 155 are engaged in the fourth wall surface 149b of the recessed portion 149 due to a restoring force of the engaging pieces 155 to restore from the resiliently bent or warped state.

The six pull-out grooves 161 are used to pull out the engaging pieces 155 of the stopper fitting 151 from the recessed portion 149. The six pull-out grooves 161 are formed in the outer edge portion of the recessed portion 149 at an angular interval equal to the angular interval of 60 degrees at which the six engaging pieces 155 of the stopper fitting 151 are formed. The pull-out grooves 161 are opened in the opposite direction to the pushing direction for the stopper fitting 151 as indicated with an arrow A2 and also opened inwardly in the radial direction of the shaft 115. As illustrated in FIG. 5, the length L3 of the pull-out grooves 161 as measured in the circumferential direction is larger than the length L2 of the engaging pieces 155 as measured in the circumferential direction. As illustrated in FIG. 6, bottom surfaces 161a of the pull-out grooves 161 formed in the pushing direction are positioned more inwardly in the pushing direction than the leading ends 155a of the engaging pieces 155 that are engaged in the fourth wall surface 149b. A jig may be used to remove the stopper fitting 151 from the recessed portion 149. The jig is used to rotate the stopper fitting 151 counterclockwise as FIG. 5 is viewed from the front or in a direction indicated with an arrow A3, and to locate the leading ends 155a of the engaging pieces 155 in the six pull-out grooves 161. The jig used may include a gripping portion and a plurality of projections integrally formed with the gripping portion. Here, the projections is inserted into a gap between two engaging pieces 155 adjacent to the ring portion 153 and then the gripping portion of the jig is rotated. Next, the engaging pieces 155 are pulled out of the pull-out grooves 161 and then the stopper fitting 151 is removed from the recessed portion 149.

The stopper fitting 151 will return to an original shape thereof once it has been removed from the recessed portion 149, namely, the engaging pieces 155 are slightly bent or warped relative to the ring portion 153. The stopper fitting 151 may be re-used to be mounted on the end bracket, following the mounting procedure as described above.

If the six push-in grooves 163A or a portion of the fourth wall surface 149b where the engaging pieces 155 are engaged in are damaged, the push-in grooves 163B of the second group may be used. The stopper fitting 151 may be pushed into the recessed portion 149 such that the six engaging pieces 155 are inserted into the push-in grooves 163B of the second group.

In this embodiment, the leading ends 155a of the engaging pieces 155 abut on the fourth wall surface 149b constituting the recessed portion 149 after the leading ends 155a have abutted on the bottom surfaces 163c of the push-in grooves 163A and are resiliently bent or warped. Thus, the engaging pieces 155 may smoothly be bent or warped. The stopper fitting 151 may readily be removed from the recessed portion 149 simply by rotating the stopper fitting 151 fixed in the recessed portion 149 by a predetermined angle in the circumferential direction, and locating the leading ends of the six engaging pieces 155 in the six pull-out grooves 161.

The total number (12 or twelve) of the push-in grooves 163A, 163B are twice more than that (6 or six) of the engaging pieces 155. If the stopper fitting 151 has been removed from the recessed portion 149 and then is to be mounted there again, the six push-in grooves 163A where the engaging pieces 155 were inserted or a portion of the fourth wall surface 149b where the engaging pieces 155 were engaged in may be damaged. If this is the case, the six engaging pieces 151 may be inserted into the six push-in grooves 163B of the second group that are different from the push-in grooves 163A of the first group that were previously used and the stopper fitting 151 may be pushed into the recessed portion 149 to fix the stopper fitting 151 therein.

Figure 7:
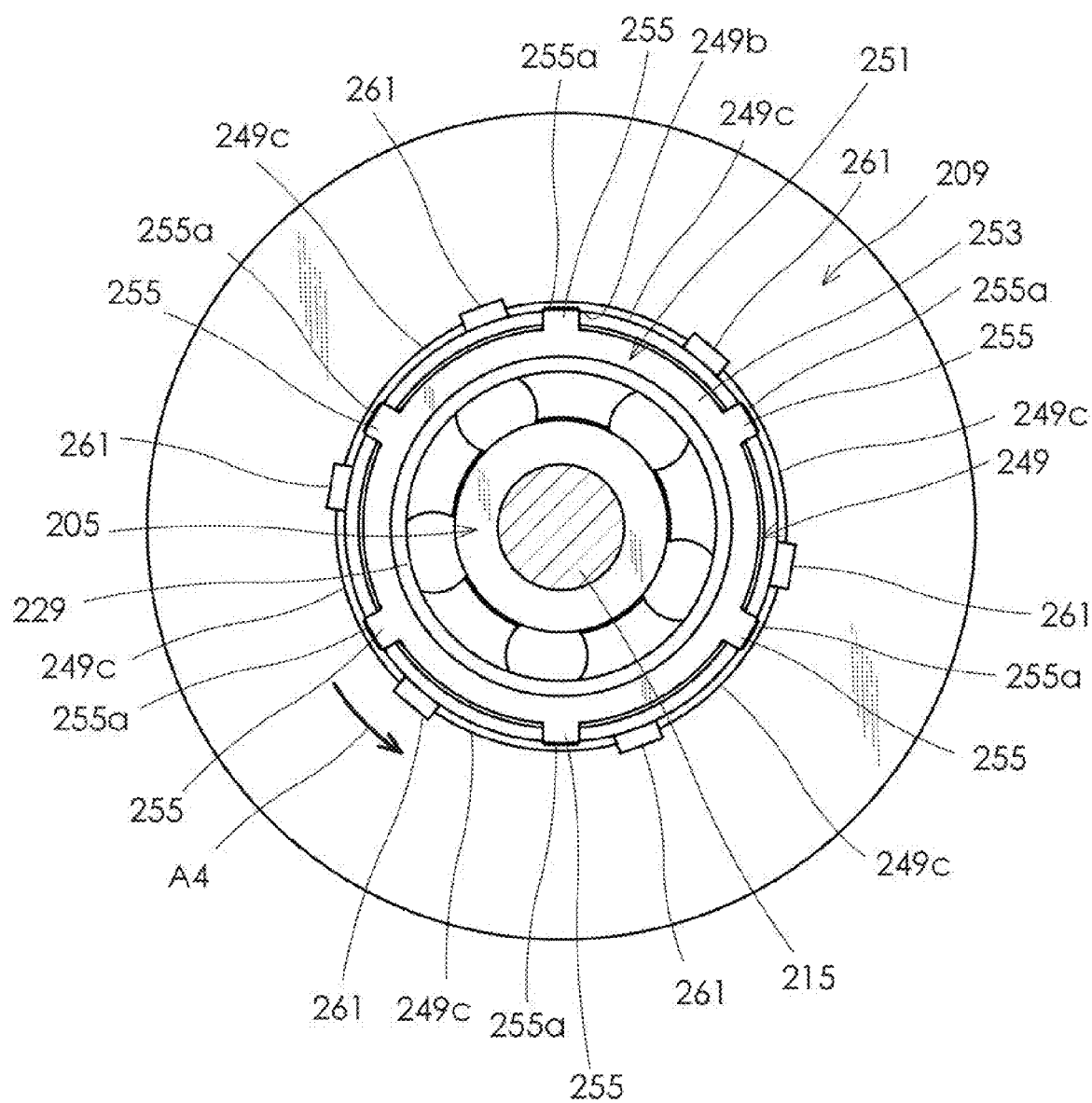
FIG. 7 is a plan view of an end bracket of a motor according to still another embodiment of the present invention, as viewed from the inside thereof.

FIG. 7 is a plan view of an end bracket 209 of a motor according to another embodiment of the present invention, as viewed from the inside thereof. The motor of this embodiment has the same structure as the motor illustrated in FIGS. 4 to 6, except the periphery of a recessed portion 249. The members and parts that are the same as those of the motor illustrated in FIGS. 4 to 6 are designated at reference numerals obtained by adding 100 to the reference numerals used for the motor illustrated in FIGS. 4 to 6, and descriptions thereof are omitted.

In this embodiment, an arc inclined surface 249c inclining outwardly in the radial direction of the shaft 215 or in the radial direction of a ring portion 253 of a stopper fitting 251 is formed between adjacent two of pull-out grooves 261 in an outer edge portion of a recessed portion 249.

In this embodiment, the stopper fitting 251 is mounted on the motor as described below. First, a pair of ball bearings 205, 207 are fitted into bearing holes 245 of end brackets 209, 211. Though the end bracket 211 and the ball bearing 207 are not shown, reference numerals are allocated to them for convenience. Next, the stopper fitting 251 is brought close to the recessed portion 249 of the end bracket 209, 211 such that six engaging pieces 255 may be slightly shifted from pull-out grooves 261. Special attention should be paid not to locate the engaging pieces 255 to face the six pull-out grooves 261. Next, the stopper fitting 251 is pushed in the recessed portion 249. Leading ends 255a of the engaging pieces 255 will abut onto the inclined surfaces 249c and then onto the fourth wall surface 249b. The six engaging pieces 255 will be resiliently bent or warped in the opposite direction to the pushing for the stopper fitting 251. Once the stopper fitting 251 is pushed in until a ring portion 253 abuts on an outer race portion 229 of the ball bearing 205, the leading ends 255a of the six engaging pieces 255 will be engaged in the fourth wall surface 249b due to a restoring force of the engaging pieces 255 to restore from the resiliently bent or warped state. Thus, mounting of the stopper fitting 251 is completed.

A jig may be used to remove the stopper fitting 251 from the recessed portion 249. The jig may be used to rotate the stopper fitting 251 counterclockwise as FIG. 6 is viewed from the front, or in a direction indicated with an arrow A4 and to locate the leading ends 255a of the engaging pieces 255 in the six pull-out grooves 261. Next, the engaging pieces 255 are pulled out of the pull-out grooves 261 and then the stopper fitting 251 is removed from the recessed portion 249.

In this embodiment, an inclined surface 249c works well as a portion where the stopper fitting 251 is pushed into the recessed portion 249.

Figure 8:
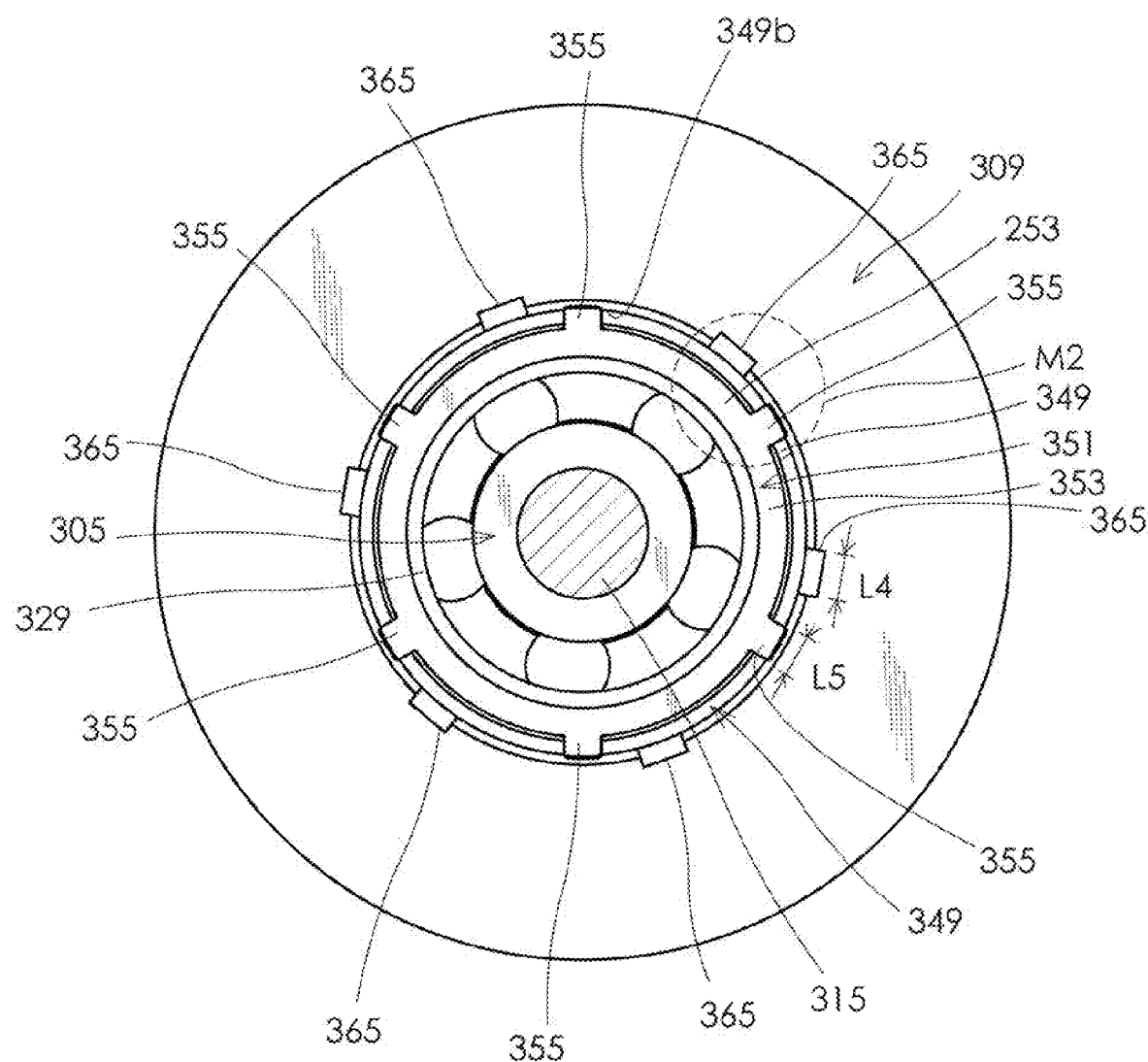
FIG. 8 is a plan view of an end bracket of a motor according to yet another embodiment of the present invention, as viewed from the inside thereof.

FIG. 8 is a plan view of an end bracket 309 of a motor according to another embodiment of the present invention, as viewed from the inside thereof. FIG. 9 is an enlarged view of a region designated at M2 in FIG. 8. The motor of this embodiment has the same structure as the motor illustrated in FIGS. 4 to 6, except the periphery of a recessed portion 349 and a stopper fitting 351. The members and parts that are the same as those of the motor illustrated in FIGS. 4 to 6 are designated at reference numerals obtained by adding 200 to the reference numerals used for the motor illustrated in FIGS. 4 to 6, and descriptions thereof are omitted. In the motor of this embodiment, six grooves 365 are formed in an outer edge portion of the recessed portion 349. The six grooves 365 have substantially the same structure as that of the pull-out grooves 161 illustrated in FIGS. 4 to 6. Specifically, the six grooves 365 are formed in the outer edge portion of the recessed portion 349 at an angular interval equal to the angular interval of 60 degrees at which the six engaging pieces 355 are formed. The grooves 365 are opened in an opposite direction to a pushing direction for the stopper fitting 351 and also opened inwardly in a radial direction of a shaft 315. As illustrated in FIG. 8, the length L4 of the grooves 365 as measured in the circumferential direction is larger than the length L5 of the engaging pieces 355 as measured in the circumferential direction. As illustrated in FIG. 9, bottom surfaces 365a of the grooves 365 formed in the pushing direction are positioned such that a ring portion 353 of the stopper fitting 351 may abut on an outer race portion 329 of a ball bearing 305 fitted in the recessed portion 349 when leading ends 355a of the engaging pieces 355 of the stopper fitting 351 are inserted into the grooves 365 and the stopper fitting 351 is fitted in the recessed portion 349.

In this embodiment, the stopper fitting 351 is flat in shape when it is not fitted in the recessed portion 349, namely, the engaging pieces 355 are not bent or warped relative to the ring portion 353. As illustrated in FIG. 9, an inclined surface 355d is formed on each of the leading ends 355a of the engaging pieces 355 of the stopper fitting 351 such that the length of the inclined surface 355d, as measured in the radial direction, increases in a direction from one end 355b to the other end 355c of the ring portion 353 in the circumferential direction. The leading ends 355a of the six engaging pieces 355 are engaged in the fourth wall surface 349b constituting the recessed portion 349.

In this embodiment, the stopper fitting 351 is mounted on the motor as described below. First, a pair of ball bearings 305, 307 are fitted into bearing holes of end brackets 309, 311. Though the end bracket 311 and the ball bearing 307 are not shown, reference numerals are allocated to them for convenience. Next, the stopper fitting 351 is brought close to the recessed portion 349 of the end bracket 309, 311 such that the grooves 365 and the six engaging pieces 355 may face each other. Then, the six engaging pieces 355 are inserted into the six grooves 365 and the stopper fitting 351 is pushed in the recessed portion 349. A jig may be used to rotate the stopper fitting 351 by a predetermined angle in a direction from the other end 355c to the one end 355b of the engaging pieces 355 or clockwise as FIG. 9 is viewed from the front or in a direction indicated with an arrow A5. Then, the leading ends 355a of the engaging pieces 355 are engaged in the fourth wall surface 349b constituting the recessed portion 349.

The jig may be used to remove the stopper fitting 351 from the recessed portion 349 by rotating the stopper fitting 351 counterclockwise as FIG. 9 is viewed from the front or in a direction opposite to a direction indicated with an arrow A5, and locating the leading ends 355a of the six engaging pieces 355 in the six grooves 365. Next, the stopper fitting 351 is removed from the recessed portion 349 by pulling out the engaging pieces 355 out of the grooves 365.

Also in this embodiment, the six engaging pieces 355 are engaged in the fourth wall surface 349, thereby tightly fixing the ball bearings onto the end brackets 309, 311 with the stopper fitting 351.

In this embodiment, the stopper fitting 351 is flat in shape. It may have a plurality of engaging pieces that are bent or warped relative to the ring portion 353.

In this embodiment, six grooves 365 are provided. The grooves may disposed at an angular interval that is one-nth of the constant angular interval at which the six engaging pieces 355 are disposed where n is an integer of at least one. For example, 12 of twelve grooves may be formed at an angular interval of 30 degrees that is ½ or a half of the constant angular interval of 60 degrees. The number of grooves (12 or twelve) is double the number of the engaging pieces 355 (6 or six). If the stopper fitting 351 has been removed from the recessed portion 349 and then is to be mounted there again, the engaging pieces 355 may be inserted into another six grooves different from the six grooved previously used. Thus, six new grooves may be used to mount the stopper fitting 351 tightly.

In the above-mentioned embodiments, the present invention is applied to a stepping motor. Application of the present invention is not limited to a stepping motor.

Now, a specific configuration of a motor according to the present invention will be described below.

The motor comprises:

a rotor including a rotor member and a shaft onto which the rotor member is fixed;

a stator disposed outside the shaft in a radial direction of the shaft to allow the rotor member to rotate therein;

a pair of ball bearings each including an inner race portion, an outer race portion, and a plurality of rolling elements disposed between the inner and outer race portions, the ball bearings rotatably supporting both ends of the shaft;

a pair of end brackets each having a bearing hole in which the ball bearing is fitted, and mounted on both ends of the stator to allow the ball bearings fitted in the bearing holes to face the rotor member, wherein the bearing holes are each defined by a first wall surface extending in the radial direction of the shaft and a second wall surface continuous with the first wall surface and extending in both a circumferential direction and an axial direction of the shaft; and a spring member disposed between the inner race portion of one of the pair of ball bearings and the rotor member and biased to space apart the inner race portion and the rotor member.

The pair of end brackets each have an annular recessed portion formed therein, and the recessed portion is defined by a third wall surface continuous with the second wall surface and extending in the radial direction and a fourth wall surface continuous with the third wall surface and extending in the circumferential direction and the axial direction. The recessed portion is fitted with a stopper fitting for fixing the ball bearing in the bearing hole. Hardness of a portion of the end bracket where the recessed portion is formed is smaller than hardness of the stopper fitting.

The stopper fitting includes a ring portion abutting on the outer race portion of the ball bearing, and a plurality of engaging pieces integrally formed with the ring portion and engaged in the fourth wall surface. The engaging pieces are disposed at a predetermined angular interval in a circumferential direction of the ring portion and extend radially outwardly from the ring portion.

Material quality of the stopper fitting and shapes of the engaging pieces and the recessed portions are determined such that the engaging pieces are resiliently bent or warped in a direction opposite to a pushing direction for the stopper fitting when the stopper fitting is pushed in the recessed portion, and leading ends of the engaging pieces are engaged in the fourth wall surface due to a restoring force of the engaging pieces to restore from the resiliently bent or warped state.

INDUSTRIAL APPLICABILITY

According to the present invention, the ball bearing may readily be fixed in the bearing hole of the end bracket, thereby preventing slippage or a creep phenomenon from occurring between the outer race portion of the ball bearing and the end bracket.

Especially, in the present invention, the ball bearing is fixed onto the end bracket using the stopper fitting. The leading ends of the engaging pieces of the stopper fitting are engaged in the fourth wall surface or the wall surface of the recessed portion simply by pushing the stopper fitting into the recessed portion, thereby fixing the ball bearing onto the end bracket.

According to the present invention, the ball bearing may readily be fixed onto the end bracket with a simple operation. Once the stopper fitting has been pushed in the recessed portion, the leading ends of the engaging pieces are resiliently bent or warped and then engaged in the fourth wall surface or the wall surface of the recessed portion constituting the recessed portion due to a restoring force of the engaging pieces to restore from the resiliently bent or warped state, thereby tightly fixing the ball bearing onto the end bracket.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A motor comprising:
    a stator;
    an end bracket having a bearing hole formed therein, and mounted on the stator;
    a ball bearing fitted in the bearing hole of the end bracket;
    a shaft supported by the ball bearing;
    a rotor member fixed on the shaft; and
    a stopper fitting for fixing the ball bearing in the bearing hole,
    the end bracket having an annular recessed portion formed therein to be fitted with the stopper fitting, wherein hardness of a portion of the end bracket where the recessed portion is formed is smaller than hardness of the stopper fitting; and
    the stopper fitting including an abutting portion abutting on an outer race portion of the ball bearing, and a plurality of engaging pieces integrally formed with the abutting portion and engaged in the recessed portion, the engaging pieces being disposed at an angular interval in a circumferential direction of the abutting portion and extending radially outwardly from the abutting portion,
    wherein material quality of the stopper fitting and shapes of the engaging pieces and the recessed portion are determined such that leading ends of the engaging pieces are engaged in a wall surface of the recessed portion.

2. The motor according to claim 1, wherein
    the material quality of the stopper fitting and the shapes of the engaging pieces and the recessed portion are determined such that the engaging pieces are resiliently bent in an opposite direction to a pushing direction for the stopper fitting when the stopper fitting is pushed in the recessed portion, and the leading ends of the engaging pieces are engaged in the wall surface of the recessed portion due to a restoring force of the engaging pieces to restore from the resiliently bent state.

3. The motor according to claim 2, wherein
    the angular interval is constant;
    a plurality of pull-out grooves for pulling out the engaging pieces are formed in an outer edge portion of the recessed portion, and are opened in the opposite direction and also opened inwardly in the radical direction;
    the length of the pull-out grooves as measured in the circumferential direction is larger than the length of the engaging pieces as measured in the circumferential direction; and
    bottom surfaces of the pull-out grooves formed in the pushing direction are positioned more inwardly in the pushing direction than the leading ends of the engaging pieces engaged in the wall surface of the recessed portion.

4. The motor according to claim 3, wherein
    a plurality of push-in grooves for pushing in the engaging pieces are formed in the outer edge portion of the recessed portion at the constant angular interval, and are opened in the opposite direction and also opened inwardly in the radial direction;
    the length of the push-in grooves as measured in the circumferential direction is larger than the length of the engaging pieces as measured in the circumferential direction; and
    bottom surfaces of the push-in grooves formed in the pushing direction are inclined such that depths of the push-in grooves increase inwardly in the radial direction, and are positioned more outwardly in the opposite direction than the bottom surfaces of the pull-out grooves.

5. The motor according to claim 3, wherein
    an inclined surface inclining outwardly in the radial direction is formed between adjacent two of the pull-out grooves in the outer edge portion of the recessed portion.

6. The motor according to claim 2, wherein
    the bearing hole of the end bracket is defined by a first wall surface extending in the radial direction of the shaft and a second wall surface continuous with the first wall surface and extending in both a circumferential direction and an axial direction of the shaft, and the end bracket is configured to allow the ball bearing fitted in the bearing hole to face the rotor member;
    the recessed portion of the end bracket is defined by a third wall surface continuous with the second wall surface and extending in the radial direction and a fourth wall surface continuous with the third wall surface and extending in the circumferential direction and the axial direction; and
    the wall surface of the recessed portion in which the engaging pieces are engaged is constituted from the fourth wall surface.

7. The motor according to claim 6, wherein
    the angular interval is constant;
    a plurality of pull-out grooves for pulling out the engaging pieces are formed in an outer edge portion of the recessed portion, and are opened in the opposite direction and also opened inwardly in the radical direction;

the length of the pull-out grooves as measured in the circumferential direction is larger than the length of the engaging pieces as measured in the circumferential direction; and bottom surfaces of the pull-out grooves formed in the pushing direction are positioned more inwardly in the pushing direction than the leading ends of the engaging pieces engaged in the fourth wall surface of the recessed portion.

8. The motor according to claim 7, wherein a plurality of push-in grooves for pushing in the engaging pieces are formed in the outer edge portion of the recessed portion at the constant angular interval, and are opened in the opposite direction and also opened inwardly in the radial direction;

the length of the push-in grooves as measured in the circumferential direction is larger than the length of the engaging pieces as measured in the circumferential direction; and bottom surfaces of the push-in grooves formed in the pushing direction are inclined such that depths of the push-in grooves increase inwardly in the radial direction, and are positioned more outwardly in the opposite direction than the bottom surfaces of the pull-out grooves.

9. The motor according to claim 7, wherein an inclined surface inclining outwardly in the radial direction is formed between adjacent two of the pull-out grooves in the outer edge portion of the recessed portion.

10. The motor according to claim 1, wherein the bearing hole of the end bracket is defined by a first wall surface extending in the radial direction of the shaft and a second wall surface continuous with the first wall surface and extending in both a circumferential direction and an axial direction of the shaft, and the end bracket is configured to allow the ball bearing fitted in the bearing hole to face the rotor member;

the recessed portion of the end bracket is defined by a third wall surface continuous with the second wall surface and extending in the radial direction and a fourth wall surface continuous with the third wall surface and extending in the circumferential direction and the axial direction;

the wall surface of the recessed portion in which the engaging pieces are engaged is constituted from the fourth wall surface;

the angular interval is constant;

a plurality of grooves are formed in an outer edge portion of the recessed portion at an angular interval which is one-nth of the constant angular interval where n is an integer of at least one, and are opened opposite to a pushing direction for the stopper fitting and also opened inwardly in the radical direction;

the length of the grooves as measured in the circumferential direction is larger than the length of the engaging pieces as measured in the circumferential direction;

bottom surfaces of the grooves formed in the pushing direction are positioned such that the abutting portion may abut on the outer race portion of the ball bearing when the leading ends of the engaging pieces of the stopper fitting are inserted into the grooves and then the stopper fitting is fitted in the recessed portion; and the stopper fitting is rotated by a predetermined angle in the circumferential direction after the engaging pieces of the stopper fitting are inserted into the grooves and then the stopper fitting gets fitted in the recessed portion, and the leading ends of the engaging pieces are engaged in the fourth wall surface of the recessed portion.

11. The motor according to claim 10, wherein an inclined surface is formed on each of the leading ends of the engaging pieces such that the length of the inclined surface, as measured in the radial direction, increases from one end to the other end of the inclined surface in the circumferential direction.

12. The motor according to claim 1, wherein an axial end portion of the shaft positioned between an inner race portion of the ball bearing and the rotor member is shaped such that the diameter of the axial end portion increases in a direction from the ball bearing to the rotor member;

a spring member is disposed between the inner race portion of the ball bearing and the rotor member, and biased to space apart the inner race portion of the ball bearing and the rotor member; and the spring member is formed of a coil spring through which the axial end portion passes.

\* \* \* \* \*